United States Patent
Chae et al.

(10) Patent No.: US 9,112,411 B2
(45) Date of Patent: Aug. 18, 2015

(54) APPARATUS AND METHOD FOR CONTROLLING A PLURALITY OF POWER CONVERTING MODULES AND APPARATUS AND METHOD FOR ANALYZING POWER QUANTITY IMBALANCE

(71) Applicant: Korea Institute of Energy Research, Daejeon (KR)

(72) Inventors: Suyong Chae, Daejeon (KR); Yujin Song, Daejeon (KR); Sukin Park, Daejeon (KR); Hakguen Jeong, Daejeon (KR); Subin Han, Daejeon (KR); Seashung Oh, Seoul (KR)

(73) Assignee: KOREA INSTITUTE OF ENERGY RESEARCH (KR)

( * ) Notice: Subject to any disclaimer, the term of this patent is extended or adjusted under 35 U.S.C. 154(b) by 137 days.

(21) Appl. No.: 13/780,531

(22) Filed: Feb. 28, 2013

(65) Prior Publication Data

US 2013/0285627 A1 Oct. 31, 2013

(30) Foreign Application Priority Data

Apr. 25, 2012 (KR) .......................... 10-2012-0043393

(51) Int. Cl.
*H02M 3/158* (2006.01)
*G05F 1/46* (2006.01)
*H02M 1/00* (2007.01)

(52) U.S. Cl.
CPC .............. *H02M 3/1584* (2013.01); *G05F 1/46* (2013.01); *H02M 2001/0009* (2013.01)

(58) Field of Classification Search
CPC ..... H02M 2001/0009; G05F 1/00; G05F 1/46
USPC .................. 323/222–225, 271–275, 282–285
See application file for complete search history.

(56) References Cited

U.S. PATENT DOCUMENTS

| | | | | |
|---|---|---|---|---|
| 5,854,743 A | * | 12/1998 | Yamamoto | 363/71 |
| 5,991,173 A | * | 11/1999 | Nishikawa | 363/37 |
| 6,534,960 B1 | * | 3/2003 | Wells et al. | 323/222 |
| 6,788,036 B1 | | 9/2004 | Milavec et al. | |
| 7,394,236 B2 | * | 7/2008 | Chapuis et al. | 323/283 |
| 7,554,310 B2 | * | 6/2009 | Chapuis et al. | 323/282 |
| 7,710,092 B2 | * | 5/2010 | Chapuis et al. | 323/282 |

(Continued)

OTHER PUBLICATIONS

Suyong Chae, et al. "Digital Current Sharing Method for Multiphase DC-DC Converters using the Peak Input Voltage" Energy Efficiency Research Division, Korea Institute of Energy Research, 2011 (pp. 1307-1311).

*Primary Examiner* — Fred E Finch, III
*Assistant Examiner* — Yusef Ahmad
(74) *Attorney, Agent, or Firm* — Harness, Dickey & Pierce, P.L.C.

(57) ABSTRACT

Disclosed is a technology related to an apparatus for controlling or analyzing a power converting module, and more particularly, to a technology for improving imbalance of power quantities processed by a plurality of power converting modules. Relative power quantities processed by the modules are detected through a common circuit element installed in an input terminal or an output terminal shared by the plurality of modules, without detecting information acquired through current or voltage sensors individually installed in respective modules, and control values of the respective modules may be compensated for through the detected relative power quantities or may be output in a form where a user can easily identify them.

7 Claims, 11 Drawing Sheets

(56) References Cited

U.S. PATENT DOCUMENTS

| | | | |
|---|---|---|---|
| 2004/0105288 A1* | 6/2004 | Watanabe et al. | 363/132 |
| 2004/0123167 A1* | 6/2004 | Chapuis | 713/300 |
| 2006/0125451 A1* | 6/2006 | Tabaian et al. | 323/222 |
| 2007/0064363 A1* | 3/2007 | Nielsen et al. | 361/90 |
| 2007/0228837 A1* | 10/2007 | Nielsen et al. | 307/82 |
| 2007/0262758 A1* | 11/2007 | Wildash | 323/272 |
| 2008/0157742 A1* | 7/2008 | Martin et al. | 323/284 |
| 2008/0157743 A1* | 7/2008 | Martin et al. | 323/284 |
| 2008/0265857 A1* | 10/2008 | Tabaian et al. | 323/288 |
| 2008/0310200 A1* | 12/2008 | Maksimovic et al. | 363/65 |
| 2009/0174262 A1* | 7/2009 | Martin et al. | 307/82 |
| 2009/0244945 A1* | 10/2009 | Hatanaka | 363/127 |
| 2011/0221408 A1* | 9/2011 | Martin et al. | 323/272 |
| 2013/0257394 A1* | 10/2013 | Wang | 323/234 |

* cited by examiner

APPARATUS AND METHOD FOR CONTROLLING A PLURALITY OF POWER CONVERTING MODULES AND APPARATUS AND METHOD FOR ANALYZING POWER QUANTITY IMBALANCE

CROSS-REFERENCE TO RELATED APPLICATION

This application claims priority from and the benefit under 35 U.S.C. §119(a) of Korean Patent Application No. 10-2012-0043393, filed on Apr. 25, 2012, which is hereby incorporated by reference for all purposes as if fully set forth herein.

BACKGROUND OF THE INVENTION

1. Field of the Invention

The present invention relates to an apparatus for controlling or analyzing a power converting module, and more particularly to a technology for improving an imbalance of power quantities processed by a plurality of power converting modules.

2. Description of the Prior Art

According to demands for standardization of power converting devices, a lot of module complex type power converting devices for converting power as much as desired by using several power converting modules in parallel have been developed. Of course, converting the required power by connecting several power converting modules in parallel is not only because of the demands for standardization. In order to optimally design the part requiring a power conversion or due to the limit of available components, the plurality of power converting modules are used in the module complex type in many cases.

One problem of the module complex type power converting device is that it is difficult to guarantee the same lifetime to several modules constituting the module complex type power converting device. The corresponding module may be broken due to a problem occurring in only one component mounted to one module or only the corresponding module may be broken due to a problem such as overloads occurring in one module. In this case, power may be converted somewhat only by the remaining modules. However, in a particular case, entire modules may become useless since required power is not converted.

The largest reason why one module included in the module complex type power converting device is first broken is that power quantities processed by each module are different from each other and thus one module is frequently used. Although two modules including A and B modules are designed to process the same power quantities, when the A module processes more power for certain reasons, a component of the A module is more easily aged (further consumes its lifetime) than that of the B module, and the A module brakes first.

SUMMARY OF THE INVENTION

Accordingly, the present invention has been made to prevent a difference in power quantities performed by a plurality of modules constituting a power converting device or accurately analyze the difference in the power quantities processed by the plurality of modules. Also, the present invention has been made to solve the basically unsolved problems occurring due to the difference in the power quantities processed by the modules through sensors using differences in characteristics of current or voltage sensors individually installed in respective modules.

In order to solve the problems, according to the present invention, relative power quantities processed by respective modules are detected through a common circuit element installed in an input terminal or an output terminal shared by the plurality of modules, without detecting information acquired through current or voltage sensors individually installed in respective modules, and control values of the respective modules may be compensated for through the detected relative power quantities or may be output in a form where a user can easily identify them.

In accordance with an aspect of the present invention, there is provided an apparatus for controlling three or more power converting modules by using a value sensed through a circuit element within each of the power converting modules, the power converting modules sharing an input terminal or an output terminal and converting power by chopping the power by using a power semiconductor, the apparatus including: a sensing unit for measuring currents or voltages formed in a common circuit element installed in the shared input terminal or output terminal, the currents or voltages being changed in accordance with power quantities processed by the three or more power converting modules; and a compensator for distinguishing the measured currents or voltages by values corresponding to the three or more power converting modules and analyzing the distinguished currents or voltages, detecting an imbalance degree of the power quantities processed by the three or more power converting modules according to variance or deviation of the distinguished and analyzed currents or voltages, and compensating for control values of some or all of the three or more power converting modules such that the detected imbalance degree decreases.

In accordance with another aspect of the present invention, there is provided a method of controlling three or more power converting modules which share an input terminal or an output terminal by an apparatus, the method including: measuring currents or voltages formed in a common circuit element installed in the shared input terminal or output terminal, the currents or voltages being changed in accordance with power quantities processed by the three or more power converting modules; and distinguishing the measured currents or voltages by values corresponding to the three or more power converting modules and analyzing the distinguished currents or voltages, detecting an imbalance degree of the power quantities processed by the three or more power converting modules according to variance or deviation of the distinguished and analyzed currents or voltages; and compensating for control values of some or all of the three or more power converting modules such that the detected imbalance degree decreases.

In accordance with another aspect of the present invention, there is provided an apparatus for analyzing a power quantity imbalance, the apparatus including: a sensing unit for measuring currents or voltages formed in a common circuit element installed in an input terminal or an output terminal shared by three or more power converting modules, the currents or voltages being changed in accordance with power quantities processed by the three or more power converting modules; an analyzer for distinguishing the measured currents or voltages by values corresponding to the three or more power converting modules and analyzing the distinguished currents or voltages, and detecting an imbalance degree of power quantities processed by the three or more power converting modules according to variance or deviation of the distinguished and analyzed currents or voltages; and an output unit for outputting information on the detected imbalance degree.

In accordance with another aspect of the present invention, there is provided a method of analyzing a power quantity imbalance, the method including: measuring currents or voltages formed in a common circuit element installed in an input terminal or an output terminal shared by three or more power converting modules, the currents or voltages being changed in accordance with power quantities processed by the three or more power converting modules; distinguishing the measured currents or voltages by values corresponding to the three or more power converting modules and analyzing the distinguished currents or voltages, and detecting an imbalance degree of power quantities processed by the three or more power converting modules according to variance or deviation of the distinguished and analyzed currents or voltages; and outputting information on the detected imbalance degree.

According to the present invention as described above, a difference in relative power quantities processed by respective modules may be identified by comparing the power quantities through a common circuit element shared by the respective power converting modules. As a result, an imbalance degree of power quantities processed by the respective modules may be more accurately detected than information acquired through a sensor installed in individual module, and the imbalance degree of the processed power quantities generated in the respective modules may be compensated for through the accurate detection and the imbalance degree may be easily identified by a manager.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
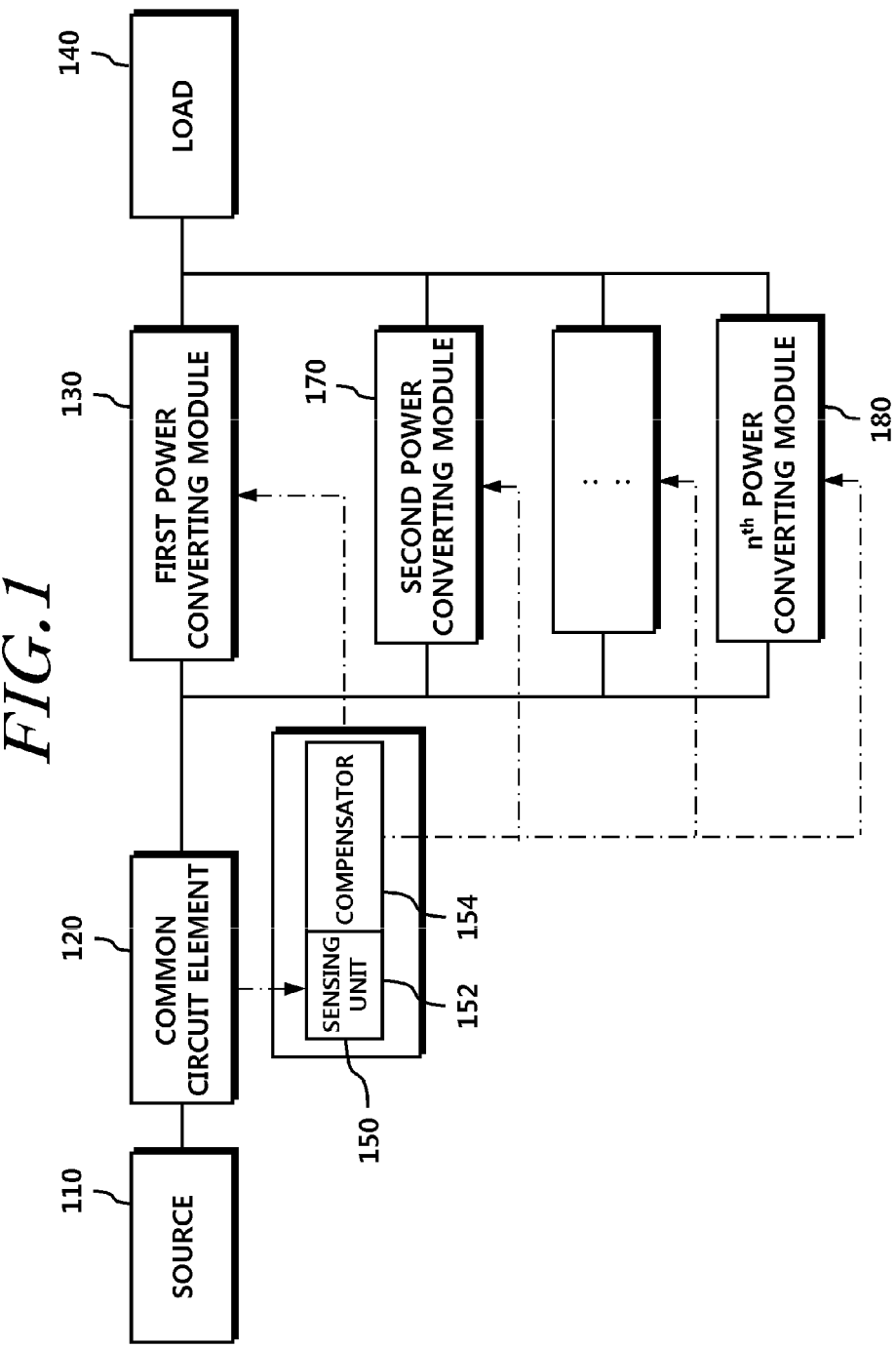
FIG. 1 is a configuration diagram of a power converting system including an apparatus according to a first embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
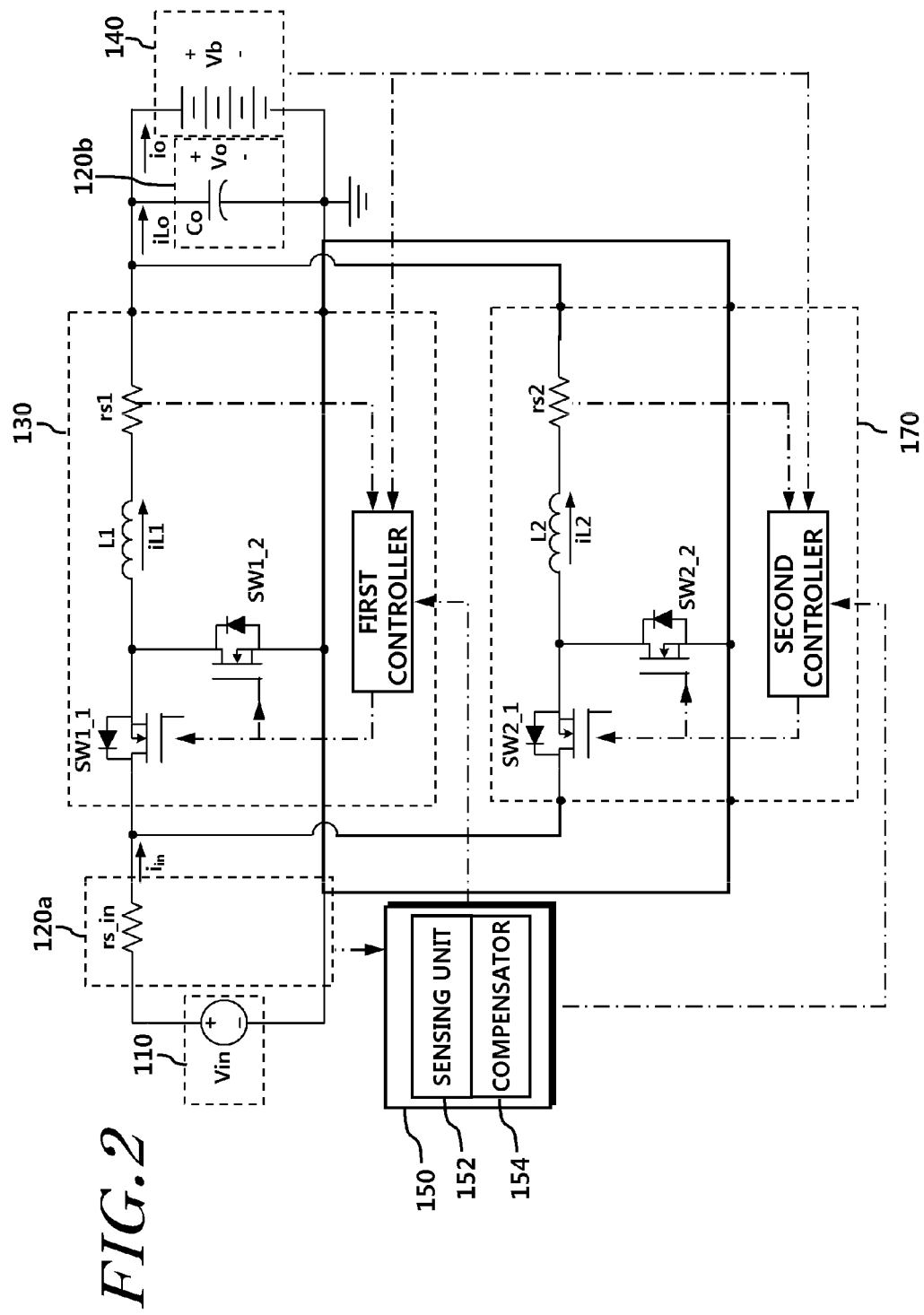
FIG. 2 is a circuit diagram illustrating one example of a power converting system including an apparatus according to an embodiment of the present invention.

FIG. 1 is a structural diagram of a power converting system including an apparatus 150 according to an embodiment of the present invention. An embodiment of the present invention will be described with reference to FIG. 1. Further, a more detailed example will be described with reference to FIG. 2. FIG. 2 is a circuit diagram illustrating one example of a power converting system including an apparatus according to an embodiment of the present invention. In FIG. 2, there are two power converting modules in the power converting system of FIG. 1 and an individual power converting module has a synchronous buck converter form. In addition, FIG. 2 illustrates a detailed circuit example of a block having a different configuration illustrated in FIG. 1. FIG. 2 is only one example circuit diagram of FIG. 1. FIG. 1 should not be limited to FIG. 1 since FIG. 2 is only a simplified type for assisting the understanding, and the present invention should not be limited to an embodiment illustrated in FIG. 1 or 2.

Referring to FIG. 1, a power converting system includes a source 110, a common circuit element 120, a first power converting module 130, a second power converting module 170, an $n^{th}$ power converting module 180, a load 140, and an apparatus 150. Further, the apparatus 150 may include a sensing unit 152 and a compensator 154.

The source 110 is a device for supplying energy, which may include a current source or a voltage source. Alternatively, using energy like a super capacitor, the source 110 may be an energy source in a form where a current and voltage are changed. Referring to FIG. 2, the source 110 is illustrated as the voltage source.

The common circuit element 120 is a circuit element shared by the first to nth power converting modules, which may be located between the source 110 and each power converting module, that is, located in a path to which energy supplied from the source 110 commonly flows before the energy is distributed to each power converting module, or may be located between each power converting module and the load 140, that is, located in a path to which added power converted by each power converting module flows. As a result, the common circuit element 120 refers to a circuit element located in a path where energy flowing in or flowing from each power converting module is added and flows.

Referring to FIG. 2, an input sensing resistor rs_in 120a is illustrated as a representative example of the common circuit element 120. In general, a resistor is not disposed in a path through which power passes, but, in some cases, is disposed as a sensor for measuring a quantity of currents passing through the path like the input sensing resistor rs_in 120a shown in the diagram. An output capacitor Co 120b illustrated in FIG. 2 is also an example of the common circuit element. However, the output capacitor Co 120b shown in the diagram is unlike the input sensing resistor 120a rs_in in that it is disposed in an output terminal. The output capacitor 120b (Co) is installed to reduce ripples (change width) of power transmitted before power converted by each power converting module is transmitted to the load 140. Further, according to the present invention, the output capacitor 120b (co) may perform a function as a sensor of a current or voltage formed while power converted by each power converting module passes through the output capacitor 120b (Co) as well as the function of reducing the ripples. Although not illustrated in FIG. 2, like the input sensing resistor 120a (rs_in) and the output capacitor 120b (Co), an output sensing resistor, an input capacitor, or an input/output inductor may be also located in the path where energy flowing in or flowing from each power converting module is added and flows, to perform the same function as that of the common circuit element 120. An example of using the input capacitor as the common circuit element 120 will be additionally described with reference to FIG. 5.

The first power converting module 130 to the $n^{th}$ power converting module 180 are devices for converting energy entering each power converting module to energy having a form desired by the load 140, and a representative example of the power converting module is a DC-DC converter. For example, when the source 110 is a 42 V battery and the load 140 is an audio device using 6 V power, voltages between the source 110 and the load 140 are different so that a direct connection therebetween is not possible. As a result, 42 V should be reduced to 6 V by using the power converting module and then supplied. In another example, when the source 110 is electricity generation energy and the load 140 is a battery, the power converting module for converting a voltage of energy is also required since a voltage generated in a fuel cell and a voltage of the battery are different. Further, a current source is changed to a voltage source, or conversely, the voltage source is changed to the current source. Alternatively, the power converting module is used to allow an instable source to supply a stable voltage.

The power converting module may not use a power semiconductor capable of switching power like a linear regulator, but a large capacity power converting module installs the power semiconductor therein and converts power by turning on/off the power semiconductor. A technology that generates desired power by chopping power by using the power semiconductor is called a power electronic technology, and the power electronic technology has been already greatly developed so that contents thereof may be easily detected by an ordinary engineer.

Next, prior to describing the apparatus 150 according to an embodiment of the present invention, an operation method of the power converting system driven without the apparatus 150 will be first described with reference to FIG. 2.

Referring to FIG. 2, the first power converting module 130 includes a 1-1 switch SW1_1, a 1-2 switch SW1_2, a first inductor L1, a first sensing resistor rs1, and a first controller. Further, the second power converting module 170 includes a 2-1 switch SW2_1, a 2-2 switch SW2_2, a second inductor L2, a second sensing resistor rs2, and a second controller. Since the first power converting module 130 and the second power converting module 170 share an input terminal and an output terminal, they actually share the same power converting function. However, the first power converting module 130 and the second power converting module 170 are independent modules from each other, each of the first power converting module 130 and the second power converting module 170 has a controller. An operation of the power converting system having the above described configuration will be described below in more detail.

Each power converting module has a reference value for controlling a current or voltage to be converted and compares the reference value with a measured actual value. The power converting module performs a control through a method of increasing power quantities to be converted when the actual value is smaller than the reference value and decreasing power quantities to be converted when the measured actual value is larger than the reference value. Also, each power converting module uses the same reference value belonging to each module in order to make power quantities to be processed the same. For example, when both the first power converting module 130 and the second power converting module 170 control the current, they have the same current reference value (for example, 1 A) for the current control. An upper end of the first power converting module 130 and the second power converting module 170 includes an upper controller for controlling each power converting module, and the current reference value may be determined by the upper controller or may be individually stored in each power converting module as a fixed value.

Since each of the power converting modules uses the same reference value, the power converting modules should theoretically process the same power quantities. However, power quantities processed by the respective power converting modules are actually different. There may be several reasons, but the difference is mainly caused from a difference in sensing resistance. Although the same reference value may be used, the same sensing resistance value cannot be used. For example, the first sensing resistor rs1 and the second sensing resistor rs2 cannot actually have the same resistance value. For this reason, even though values sensed through two resistors are calculated as the same value of 1 A, it is not possible to conclude that current qualities actually flowing in the respective resistors are the same as 1 A. Even if a high precision resistor of 0.1% is used as a sensing resistor, power quantities processed by two power converting modules may have a maximum of about 0.1% errors. There is a basic limitation somewhat in balancing the power quantities processed by the respective power converting modules by using the value sensed through the circuit element located within each module.

The power converting system including the apparatus 150 according to an embodiment of the present invention will be described again. A reason why the above described problems are generated is that the sensing resistor installed in each module is used to balance the power quantities processed by the respective power converting modules. In order to solve the problems, a balanced degree of power quantity processed by each module should be detected by using the circuit element (sensing resistor or the like) commonly used by each power converting module instead of using each sensing resistor installed in each module. Since the apparatus 150 according to an embodiment of the present invention detects a balance/imbalance degree of the power quantity processed by each module by using the common circuit element 120, the above described problems are removed.

Figure 3:
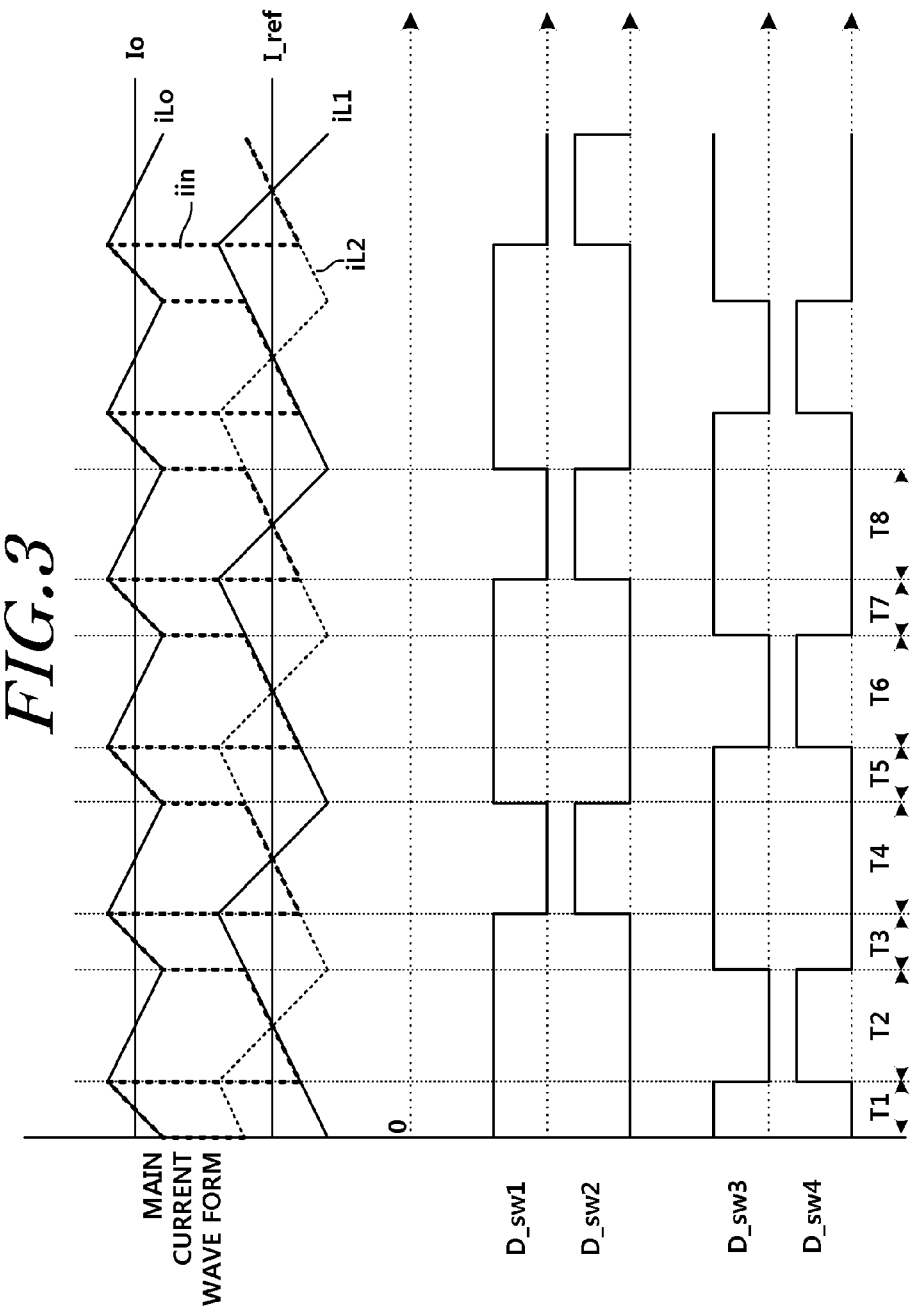
FIG. 3 is a timing diagram of a main current waveform and switching when power quantities processed by a first power converting module and a second converting module balances.

A method of comparing power quantities processed by the respective power converting modules by using the common circuit element 120 will be described in detail. FIG. 3 is a timing diagram of a main current waveform and switching when power quantities processed by the first power converting module 130 and the second power converting module 170 balance. A first inductor current iL1 of the first power converting module 130 determines a waveform thereof according to on/off states of the 1-1 switch and the 1-2 switch, and a second inductor current iL2 of the second power converting module 170 also determines a waveform thereof according to on/off states of the 2-1 switch and the 2-2 switch. A waveform of an input current iin is also determined according to a partial sum of the first inductor current iL1 and the second inductor current iL2. Here, the partial sum means that the inductor current cannot contribute to the waveform of the input current when the upper switch (here, the 1-1 switch and the 2-1 switch) is turned off in a converting method of a buck type in determining a shape of the input current iin. Referring to FIG. 3, the input current iin has a form of adding the first inductor current iL1 and the second inductor current iL2 in T1 and T3, the input current iin is the same as the first inductor current iL1 in T2, and the input current iin is the same as the second inductor current iL2 in T4.

According to such a principle, by observing the waveform of the input current iin according to time domains during a predetermined cycle, the current quantity processed by each power converting module may be identified. Since the power quantity processed when output voltages are the same is a value which represents the power quantity, values changed in accordance with power quantities processed by the respective power converting modules may be distinguished and analyzed by detecting the waveform of the input current iin. Since the waveform of the input current iin may be detected through the input sensing resistor rs_in 120a used as the common circuit element again, the imbalance degree of power quantities processed by the respective power converting modules may be detected by sensing and analyzing the current formed in the common circuit element.

A process of detecting an imbalance degree through the main current waveform and the common circuit element 120 when there is imbalance among power quantities processed by the respective power converting modules will be described in more detail with reference to FIG. 4.

Figure 4:
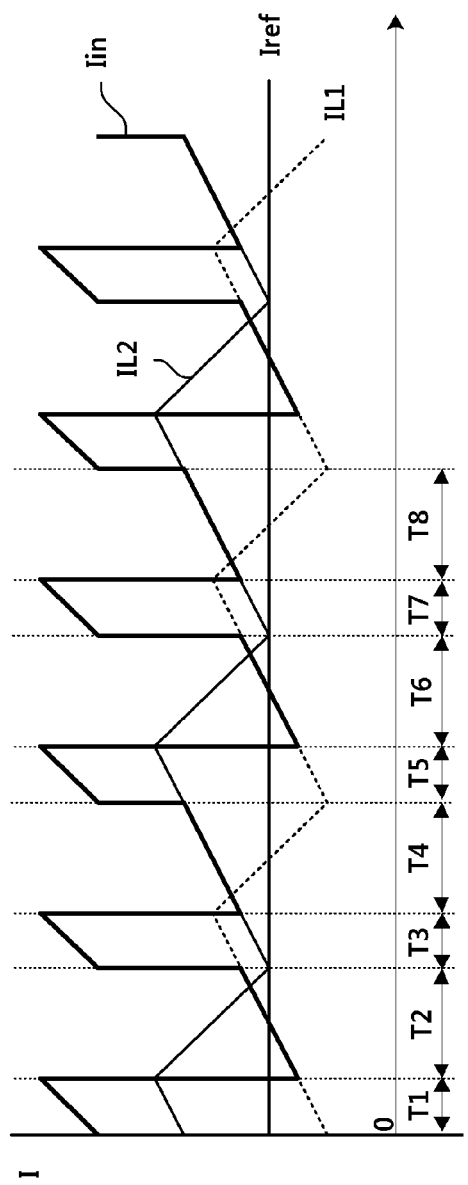
FIG. 4 is a diagram of a main current waveform when there is a difference in power quantities processed by a first power converting module and a second converting module.

FIG. 4 is a diagram of the main current waveform when there is a difference in power quantities processed by the first power converting module 130 and the second power converting module 170. Referring to FIG. 4, it may be identified that the first inductor current iL1 is totally lower than the second inductor iL2. Such a phenomenon may be identified through the waveform of the input current iin, wherein the input current iin changed according to the first inductor current iL1 may be identified from a time domain of T2, and the input current iin changed according to the second inductor current iL2 may be identified from a time domain of T4. As identified through the waveform of the input current iin in T2 and T4, the first inductor current iL1 is lower than the second inductor current iL2. The power converting device including a converter converts power in accordance with repeated time on a regular cycle, and a relative value of the power quantity processed by a particular power converting module may be identified by using a value corresponding to a particular time domain within the repeated regular cycle.

The process of detecting imbalance among power quantities processed by the respective power converting modules does not need to be faster than a control dynamic in each individual power converting module. Even though there is imbalance, improvement thereof may be compensated for and achieved in the long term in many cases. Accordingly, it is not required to sense all time domains corresponding to the respective power converting modules within one cycle. Referring to FIG. 4, the input current iin is sensed in the time domain T2 in order to estimate the power quantity processed by the first converting module 130, and the input current iin does not need to be sensed in the T4 time domain in order to estimate the power quantity processed by the second power converting module 170. Of course, if time domains corresponding to all power converting modules are sensed in one cycle, a quick action can be taken, but it is not required to sense the time domains corresponding to all power converting modules when quick action is not needed. When the value corresponding to the first power converting module 130 is acquired from the time domain T2, a value corresponding to the second power converting module 170 may be acquired from a time domain T8 within a next cycle. Since the same waveforms are repeated, the measurement may be performed in any cycle. When n power converting modules are used, values corresponding to the power quantities processed by the power converting modules may be acquired by sensing the power converting modules once per cycle of n cycles. Accordingly, a sampling time for the sensing may be long and a relatively cheap component may be used. Of course, slower sensing may be performed. The time domain corresponding to each power converting module may be sensed on every two or three cycles, not every cycle.

The converter using the power semiconductor maintains any peak waveform mainly according to a switching time of the power semiconductor. Referring to FIG. 4, the second inductor current iL2 between T1 and T2 indicates an upward peak, and the first inductor current iL1 between T3 and T4 indicates an upward peak. In a case of a resonance type converter, a middle section, not a switching time, indicates a peak. Since the converter converts power through a chopping technique of cutting off flowing energy, such a peak is always shown. When a plurality of power converting modules is used, the peak should be uniformly maintained within one cycle. Referring to FIG. 3, it may be identified that upward peak values and downward peak values of the input current iin are the same within one cycle. However, referring to FIG. 4, it may be identified that upward peak values of the input current iin are the same, but downward peak values are not the same within one cycle. It is a phenomenon generated by imbalance among power quantities processed by the first power converting module 130 and the second power converting module 170. Accordingly, it is possible to detect whether there is imbalance in the respective power converting modules by estimating peak values.

The technology for measuring the input current iin by using the input sensing resistor rs_in as the common circuit element 120 and detecting the imbalance degree of power quantities processed by the respective power converting modules by analyzing the measured input current iin has been described. A technology for detecting the imbalance degree of power quantities processed by the respective power converting modules by using the input capacitor as the common circuit element 120 will be described.

Figure 5:
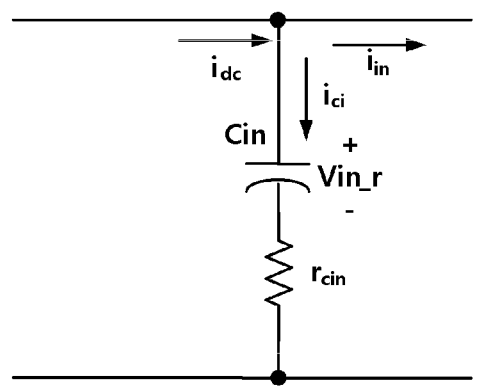
FIG. 5 is a circuit diagram for expressing an input/output current and voltage of a capacitor when the capacitor is used as a common circuit element.

FIG. 5 is a circuit diagram expressing an input/output current and voltage of a capacitor when the capacitor is used as the common circuit element 120. An input capacitor Cin may be located in the same position as that of the input sensing resistor rs_in. However, there is a difference in that while the input sensing resistor rs_in is connected in series in a direction the same as the flow of the current, the input capacitor Cin is connected in parallel in a direction the same as the input voltage. Using the input capacitor Cin may refer to a common case since the source 110 includes a plurality of noises and the present invention may be easily implemented without a separate circuit element since the imbalance degree of power quantities processed by the respective power converting modules is detected by using the input capacitor Cin.

Figure 6:
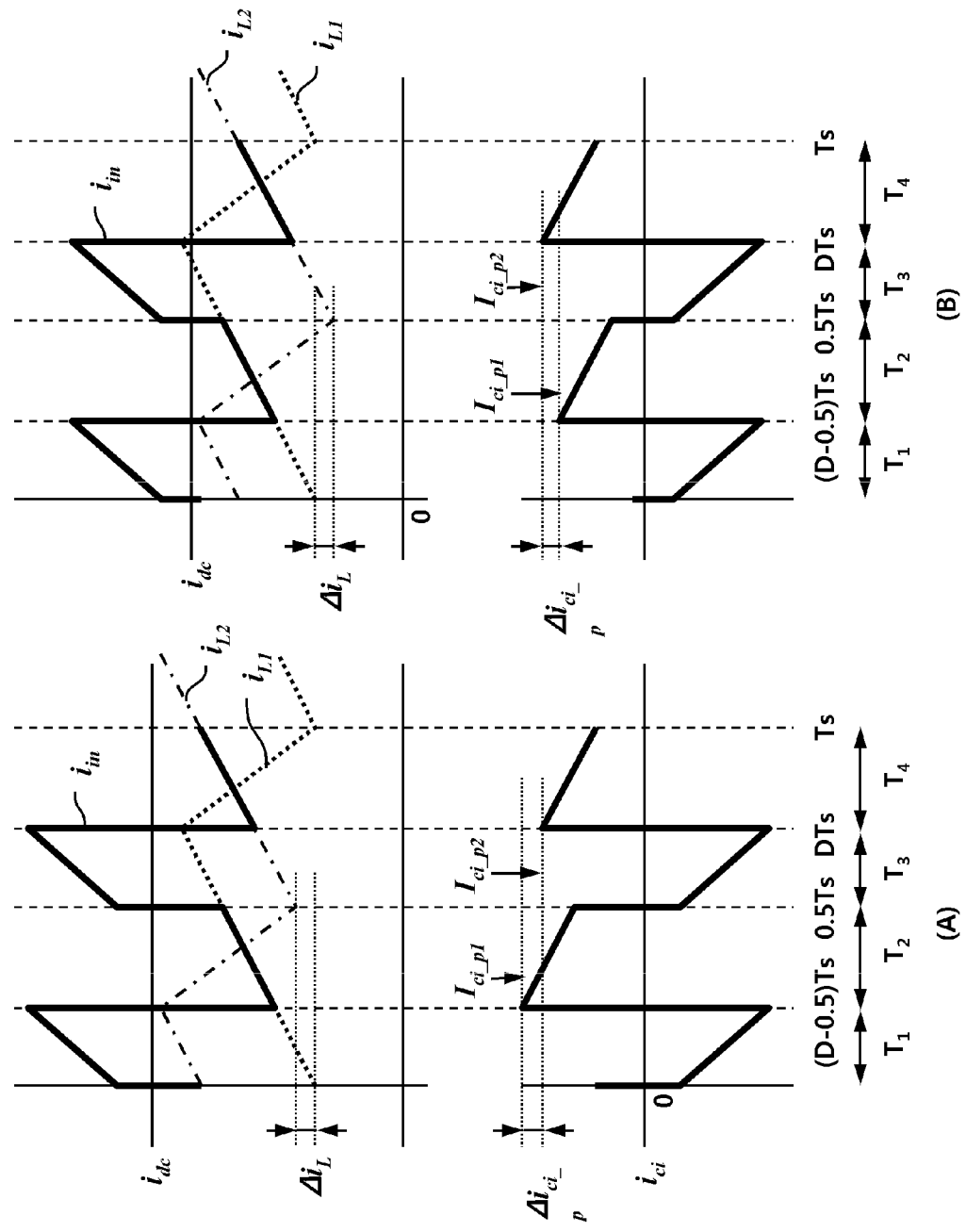
FIG. 6 is a diagram of an input/output current of an input capacitor and a main current waveform when there is a difference in power quantities processed by a first power converting module and a second power converting module.

A detailed operation method will be described with reference to FIG. 6. FIGS. 6A and 6B are diagrams of an input/output current ici of the input capacitor Cin and the main current waveform when there is a difference among power quantities processed by the first power converting module 130 and the second power converting module 170. Referring to FIG. 6A, the second inductor current iL2 is higher than the first inductor current iL1. It may be assumed that a supplied current idc is constant as a current supplied by the source 110. The capacitor input/output current ici input/output into the input capacitor Cin is determined by a difference between the supplied current idc and the input current iin. ici=idc−iin. Accordingly, the capacitor input/output current ici configures a waveform having a shape opposite to the input current iin. That is because the supplied current idc is constant as described above. Then, like the process of detecting the imbalance degree of power quantities processed by the respective power converting modules by sensing the input current iin, the imbalance degree of power quantities processed by the respective power converting modules may be detected by sensing the capacitor input/output current ici. Referring to FIG. 6A, it may be identified that the second inductor current iL2 is configured to be higher than the first inductor current iL1 and thus a current difference Δ ici_p is generated between upward peak values ici_p1 and ici_p2 of the capacitor input/output current. Referring to FIG. 6B, the first inductor current iL1 is configured to be higher than the second inductor current iL2 and thus a current difference Δ ici_p is generated between upward peak values ici_p1 and ici_p2 of the capacitor input/output current. In order to sense the capacitor input/output current ici, adding the sensing resistor to the input capacitor Cin in series or separately install a current sensor for reading a magnetic field changed according to the flow of the current to detect the current is required.

There is a method of detecting the imbalance degree of power quantities processed by the respective power converting modules without adding the separate additional sensor or resistor to the input capacitor Cin, which corresponds to a method of detecting a ripple voltage of the input capacitor Cin. The waveform of the ripple voltage of the input capacitor Cin is theoretically determined according to a value integrated from the input/output current ici, and then the determined waveform of the ripple voltage may be used. However, when one cycle is very fast like the converter and a relatively cheap capacitor which has a large capacity is used as the input capacitor, capacitor parasitic resistance rcin is large, so that the waveform has a form of the product of input/output current ici and parasitic resistance rcin, which is similar to that of the input/output current ici.

Figure 7:
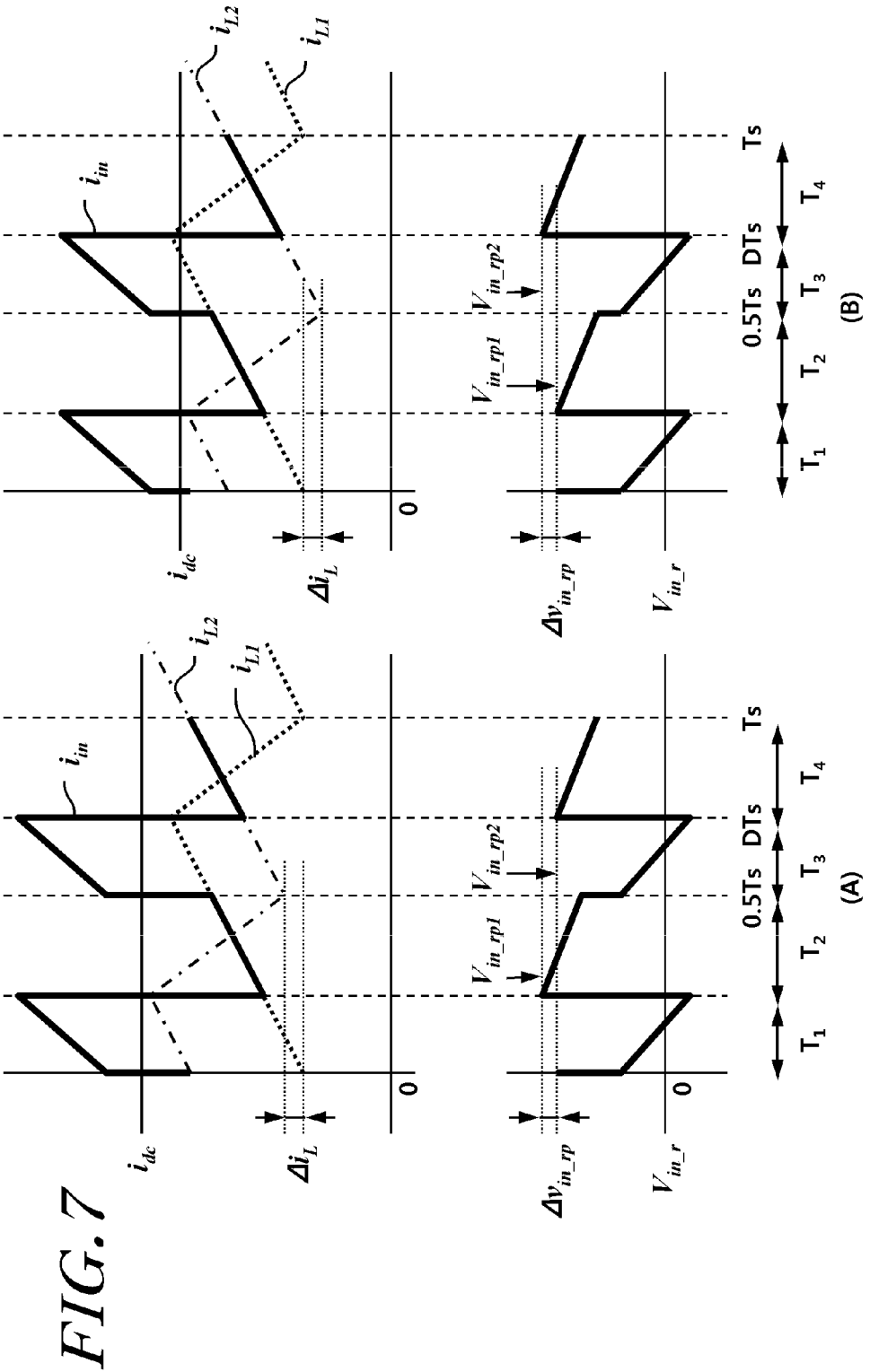
FIG. 7 is a diagram of a riffle voltage of an input capacitor and a main current waveform when there is a difference in power quantities processed by a first power converting module and a second power converting module.

The waveforms illustrated in FIGS. 7A and 7B correspond to the latter case. FIGS. 7A and 7B are diagrams of a ripple voltage Vin_r of the input capacitor Cin and the main current waveform when there is a difference in power quantities processed by the first power converting module 130 and the second power converting module 170. Since the ripple voltage Vin_r has the same shape as that of the input/output current ici, it is possible to detect the imbalance degree of power quantities processed by the respective power converting modules by applying the same method which has been applied to the input/output current ici. More specifically, referring to FIG. 7A, it may be identified that the second inductor current iL2 is configured to be higher than the first inductor current iL1 and thus a voltage difference Δ Vin_rp is generated between upward peak values Vin_rp1 and Vin_rp2 of the capacitor ripple voltage Vin_r. Referring to FIG. 7B, the first inductor current iL1 is configured to be higher than the second inductor current iL2 and thus the voltage difference Δ Vin_rp is generated between the upward peak values Vin_rp1 and Vin_rp2 of the capacitor ripple voltage Vin_r. Unlike measuring the input/output current ici, the implementation is possible without installing a separate additional sensing circuit element.

The method provided by an embodiment of the present invention may be applied to all of circuit elements having a current or voltage value changed in accordance with power quantities processed by a plurality of power converting modules, such as the input sensing resistor rs_in which has been described as the circuit element installed in the input terminal or the output terminal to be shared, such as the inductor, the resistor, and the capacitor as well as the input sensing resistor rs_in and the input capacitor Cin.

Now, an internal block of the apparatus 150 will be described. The apparatus 150 may include the sensing unit 152 and the compensator 154. The apparatus 150 corresponds to an apparatus for controlling a plurality of power converting modules sharing the input terminal or the output terminal. The sensing unit 152 measures a current or voltage formed in the common circuit element 120 installed in the shared input terminal or output terminal. Here, the current or voltage formed in the common circuit element 120 has features changed in accordance with power quantities processed by the plurality of power converting modules. The compensator 154 grasps the imbalance degree of the power quantities processed by the plurality of power converting modules by analyzing the measured current or voltage, and compensates for control values of some or all of the power converting modules among the plurality of power converting modules according to the grasped imbalance degree.

Now, the function of the compensator 154 will be additionally described. In a case of the converter for controlling processed power quantities by controlling an on or off duty of the power switch, the compensator 154 may compensate for control values of some power converting modules by changing the duty in Pulse Width Modulation (PWM) of some power converting modules for which the compensator 154 desires to compensate. Although the compensator 154 may directly change the duty, it is easier to perform the compensation by controlling a reference value. For example, in a case where the compensator 154 desires to compensate for a control value of the power converting module including a current control, when the power quantity is desired to be reduced, a current control reference value is reduced. Then, the duty is also naturally controlled and the power quantity is reduced. In a case where a voltage control reference is used, when the power quantity is desired to be increased, a control value of the corresponding power converting module is compensated for by increasing the voltage control reference value of the corresponding power converting module, and the power quantity processed by the corresponding power converting module may be increased through a result of the compensation.

Figure 8:
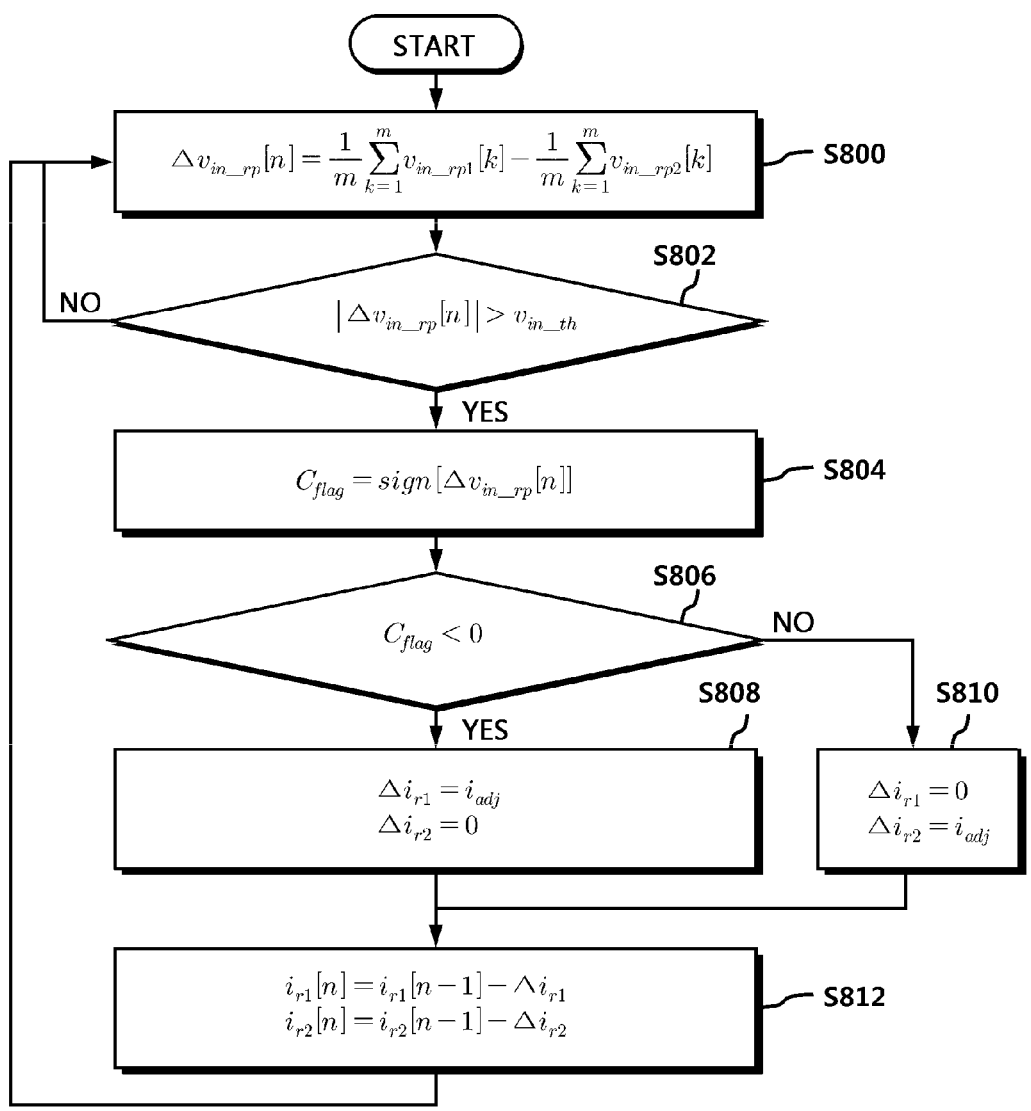
FIG. 8 is a flowchart illustrating a process of compensating a control value of a power converting module by using a ripple voltage of an input capacitor.

A process in which the compensator 154 detects the imbalance degree of processed power quantities and compensates for the power converting module according to the imbalance degree will be described with reference to FIG. 8. FIG. 8 is a flowchart illustrating a process of compensating for a control value of the power converting module by using the input capacitor Cin and the ripple voltage Vin_r. In FIG. 8, Vin_rp1 is a value acquired from the time domain T2 of FIG. 7, which is a value corresponding to the power quantity processed by the first power converting module 130, and Vin_rp2 is a value acquired from the time domain T4 of FIG. 7, which is a value corresponding to the power quantity processed by the second power converting module 170. [k] in digital processing refers to a kth value. Vrp_th is a threshold value, which is a reference value for comparison. Cflag refers to a sign, and has a value of 1 in a case of a positive number and has a value of −1 in a case of a negative number. iadj refers to a size of a value compensated for at one time, ir1 refers to a current reference value of the first power converting module, and ir2 refers to a current reference value of the second power converting module. Further, $\Delta$ ir1 refers to a quantity of the current reference of the first power converting module 130 which is desired to be changed at one time, and $\Delta$ ir2 refers to a quantity of the current reference of the second power converting module 170 which is desired to be changed at one time More specifically, in the process, a size of the ripple voltage corresponding to each power converting module is first acquired and then an average thereof is calculated. Referring to FIG. 8, averages of recently acquired m values (m is a natural number equal to or larger than 1) are calculated, respectively. A difference $\Delta$ Vin_rp in the average values is calculated in step S800. When the difference $\Delta$ Vin_rp in the average values is not larger than a reference value Vrp_th (no in step S802), it is determined that the power quantities processed by the respective power converting modules somewhat balance and thus the control value is not compensated for. When it is determined that the difference $\Delta$ Vin_rp is large enough (yes in step S802), the next step is performed. In the next step, a sign of $\Delta$ Vin_rp is first identified. When the sign is a positive number, it means that the second inductor current iL2 is larger. In contrast, when the sign is a negative number, it means that the first inductor current iL1 is larger in step S804. It is determined whether a size of the sign Cflag is a negative number or a positive number through a comparison with "0" in step S806. When the sign is a negative number, the quantity iadj to be compensated for is input into $\Delta$ ir1 to change a current reference size of the first inductor current and $\Delta$ ir2 for the second inductor current is maintained as "0" in step S808. When the sign is a positive number, $\Delta$ ir1 for the first inductor current is maintained as "0" and the quantity iadj to be compensated for is input into $\Delta$ ir2 for the second inductor current in step S810. Thereafter, by subtracting $\Delta$ ir1 and $\Delta$ ir2 from the current reference values of the power converting modules, the control value of each power converting module is compensated for in step S812.

It has been described that the control values of both the first power converting module 130 and the second power converting module 170 may be compensated for in the above process, but the control module of only some of the power converting modules may be changed. For example, in the above example, when the sign Cflag is a negative number, the same operation is performed. When the sign Cflag is a positive number, the quantity iadj to be compensated for is subtracted from $\Delta$ ir1 for the first inductor current and $\Delta$ ir2 for the second inductor current is continuously maintained as "0". Accordingly, the same result may be acquired.

The compensator 154 may compensate for control values of some or all of the power converting modules such that the detected imbalance degree decreases. More specifically, the compensator 154 distinguishes currents or voltages measured through the sensing unit 152 by values corresponding to a plurality of power converting modules and analyzes the distinguished currents or voltages, detects a difference in the distinguished and analyzed currents or voltages as the imbalance degree, and compensates for the control value of the first power converting module 130 according to the detected imbalance degree such that the current or voltage corresponding to the first power converting module 130 among the plurality of power converting modules is equal to the current or voltage corresponding to the second power converting module 170 or is located within a predetermined range.

The compensation made according to the difference in the current or voltage values measured by the sensing unit 152 has been described. Hereinafter, a method of using statistical value information such as variance, deviation or the like will be described. When two power converting modules are compensated for, compensating for the power converting modules by using a difference in currents or voltages measured by the power converting modules may be an easy method. Of course, the method is not limited to the two power converting modules, and it is apparent that the method may be applied to two or more power converting modules. With respect to three or more power converting modules, another method may be found, which uses statistical value information such as variance, deviation or the like. Of course, it is natural that the method may be also applied to the two power converting modules.

By applying the method, which is the same as that applied to the two power converting modules, to three or more power converting modules, a current or voltage value corresponding to each power converting module may be acquired. For the acquired values, a process of calculating statistical value information such as variance, deviation, standard deviation or the like is a generally known process. The calculated statistical value information becomes a representative value which may indicate the imbalance degree of power quantities processed by the respective power converting modules as one numerical value. For example, in a case where variance has been acquired, when the variance value is larger, it means that the imbalance degree of the power quantities processed by the respective power converting modules is larger. So do standard deviation. Here, the embodiment is limited to the case where the variance value is calculated for the easier description. When control values of some or all of the power converting modules are compensated for such that the calculated variance value becomes smaller, the imbalance degree of the power quantities processed by the respective power converting modules is controlled to be small. As a result, the compensator 154 according to an embodiment of the present invention distinguishes the currents or voltages measured by the sensing unit 152 by values corresponding to the plurality of power converting modules and analyzes the distinguished currents or voltages, detects statistical value information such as variance or deviation of the distinguished and analyzed currents or voltages as the imbalance degree, and compensates for control values of some or all of the power converting modules such that the detected imbalance degree decreases.

One example of a method of controlling the imbalance degree of three or more power converting modules to be small will be described. When the imbalance degree is detected by variance, the control value is compensated for by first selecting one of a plurality of power converting modules. Then, the variance value becomes small by the control of the corresponding power converting module. As a concrete example, when values measured for three power converting modules including the first power converting module, the second power converting module, and the third converting module are 12, 10, and 8, respectively, the variance is 8. Here, when the control value of the first power converting module is controlled such that the imbalance degree (here, variance value) becomes small, the control value is continuously controlled until the value measured by the sensing unit 152 is changed to 9 from 12. When the value becomes 9, the variance value does not decrease any more (in this case, the variance value decreases by 2). When the value becomes a value which is not 9, the variance value rather increases. The compensator 154 continuously compensates for the control value of the first power converting module such that the detected imbalance degree (here, variance) becomes small. It is determined that the imbalance degree does not become small even though the control value of the first power converting module has been compensated for or an imbalance degree value is changed to a value equal to or smaller than a preset value, the compensator 154 starts compensating the control value of the second power converting module. In the above example, when the value measured for the first power converting module is 9 and the variance value does not decrease any more, the compensator 154 decreases the imbalance degree by compensating the control value of the second power converting module. According to a change in the control value by the compensator 154, the value measured for the second power converting module will be 8.5. Next, the imbalance degree (here, variance) is reduced by compensating the control value of the third converting module. When the variance value is within a predetermined range through repeating the process, the compensation process is completed. It has been described that numbers are assigned to the power converting modules and the process is sequentially performed according to the numbers, but the present invention is not limited thereto. It should be understood that when one power converting module is completely compensated for, another power converting module is compensated for.

In the description of an embodiment of the present invention, the drawings and detailed operation method have been described based on a buck type. However, the present invention is not limited to the buck type, may be applied to a different power converting module including a buck type, a boost type, a flyback type, a cuck type, a resonant type, and a bridge type. Particularly, when power is processed in the boost type, installing the common circuit element 120 in the output terminal and sharing the common circuit element 120 may be more preferable method. Of course, the present invention is not limited to such a configuration example.

In the above description, the apparatus 150 for controlling a plurality of power converting modules according to an embodiment of the present invention has been described. Hereinafter, a method in which the apparatus 150 according to an embodiment of the present invention controls a plurality of power converting modules will be described. The method of controlling a plurality of power converting modules according to an embodiment of the present invention described below may all be performed by the apparatus 150 according to an embodiment of the present invention illustrated in FIG. 1.

Figure 9:
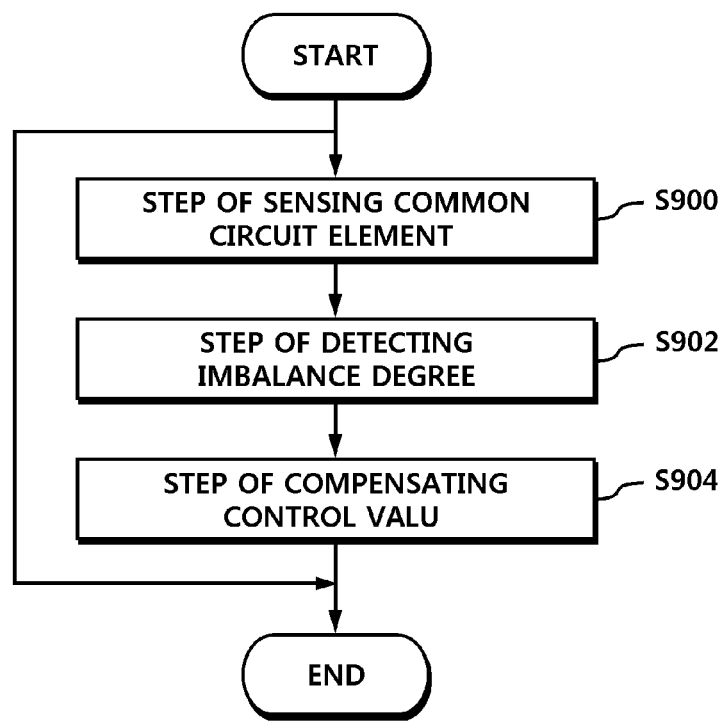
FIG. 9 is a flowchart illustrating a method in which an apparatus according to an embodiment of the present invention controls a plurality of power converting modules.

FIG. 9 is a flowchart illustrating a method in which the apparatus 150 according to an embodiment of the present invention controls a plurality of power converting modules.

First, the apparatus 150 measures a current or voltage formed in the common circuit element 120 installed in an input terminal or an output terminal shared by the plurality of power converting modules in step S900. Here, the measured current or voltage has features in being changed in accordance with power quantities processed by the plurality of power converting modules. When the measurement is completed, the apparatus 150 detects the imbalance degree of the power quantities processed by the plurality of power converting modules by analyzing the measured current or voltage in step S902. Next, the apparatus 150 compensates for control values of some or all of the plurality of power converting modules according to the detected imbalance degree.

It has been described that the method of controlling a plurality of power converting modules according to an embodiment of the present invention is performed according to the process of FIG. 9, it is only for the convenience of descriptions, and an order of performance processes of respective steps may be changed, two or more steps may be combined, or one step may be divided into two or more steps and then performed without departing from the essential concept of the present invention.

In the above description, the apparatus 150 for controlling a plurality of power converting modules according to an embodiment of the present invention and the method thereof have been described. Hereinafter, a power quantity imbalance analyzing apparatus for analyzing the imbalance degree of power quantities processed by the plurality of power converting modules and a method thereof will be described.

The apparatus 150 according to an embodiment of the present invention improves the imbalance by detecting the imbalance degree of the power quantities and then automatically compensating for the control value. The apparatus features in functioning as a part of the power converting system. The apparatus for analyzing the imbalance degree of power quantities described as another embodiment of the present invention functions as analyzing the imbalance degree of power quantities processed by the power converting modules included in the already installed power converting system, and allows a manager to change some control values of the installed power converting system or provides information such that some circuit elements are replaced.

Figure 10:
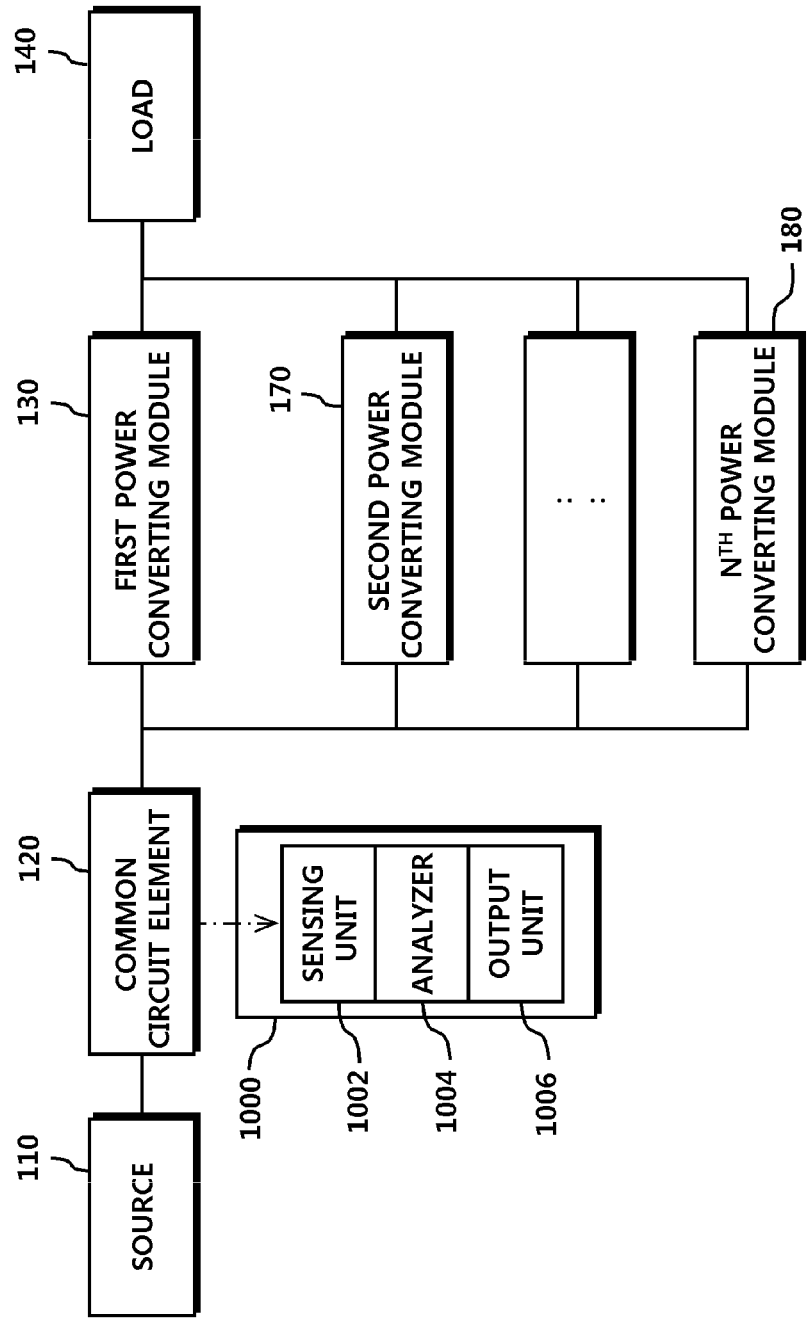
FIG. 10 is a structural diagram of a power converting system including a power quantity imbalance analyzing apparatus according to another embodiment of the present invention.

FIG. 10 is a structural diagram of a power converting system including a power quantity imbalance analyzing apparatus 1000 according to another embodiment of the present invention. Referring to FIG. 10, the power quantity imbalance analyzing apparatus 1000 may include a sensing unit 1002, an analyzer 1004, and an output unit 1006.

The sensing unit 1002 measures a current or voltage formed in the common circuit element installed in an input terminal or an output terminal shared by a plurality of power converting modules. Here, the measured current or voltage features in being changed in accordance with power quantities processed by the plurality of power converting modules.

The analyzer 1004 detects the imbalance degree of the power quantities processed by the plurality of power converting modules by analyzing the measured current or voltage.

It may be understood that the part where the sensing unit 1002 measures the current or voltage formed in the common circuit element and the analyzer 1004 detects the imbalance degree of the power quantities processed by the respective power converting modules can adopt the technology applied by the sensing unit 152 and the compensator 154 of the apparatus 150 according to an embodiment of the present invention. Accordingly, the part described as the concrete example thereof may be referred to by the power quantity imbalance analyzing apparatus 1000 according to another embodiment of the present invention. Here, to avoid redundancy of explanations, a detailed description thereof will be omitted.

The output unit 1006 outputs the detected imbalance degree through a screen, paper or the like so that a manager can easily detect the output imbalance degree.

As necessary, the apparatus 1000 may further include a compensator (not shown) for compensating for control values of some or all of the plurality of power converting modules by transmitting electrical signals for compensating the control values of some or all of the power converting modules according to the detected imbalance degree to some or all of the power converting modules. It may be understood that a type of auto calibration function is further included.

In the above description, the power quantity imbalance analyzing apparatus 1000 according to another embodiment of the present invention has been described. Hereinafter, a method in which the apparatus 1000 according to another embodiment of the present invention analyzes the imbalance degree of the power quantities processed by the plurality of power converting modules will be described. The method of analyzing the imbalance degree of the power quantities processed by the plurality of power converting modules according to another embodiment of the present invention described below may all be performed by the apparatus 1000 according to another embodiment of the present invention illustrated in FIG. 10.

Figure 11:
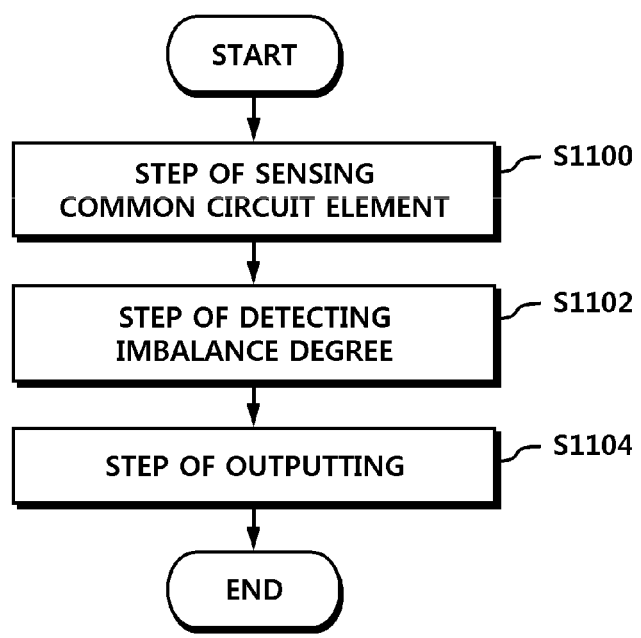
FIG. 11 is a flowchart illustrating a method in which a power quantity imbalance analyzing apparatus according to another embodiment of the present invention analyzes an imbalance degree of power quantities processed by a plurality of power converting modules.

FIG. 11 is a flowchart illustrating a method in which the power quantity imbalance analyzing apparatus 1000 according to another embodiment of the present invention analyzes the imbalance degree of power quantities processed by a plurality of power converting modules.

First, the apparatus 1000 measures a current or voltage formed in the common circuit element 120 installed in an input terminal or an output terminal shared by the plurality of power converting modules in step S1100. Here, the measured current or voltage has the feature of being changed in accordance with power quantities processed by the plurality of power converting modules. When the measurement is completed, the apparatus 1000 detects the imbalance degree of the power quantities processed by the plurality of power converting modules by analyzing the measured current or voltage in step S1102. Next, the apparatus 1000 outputs information on the detected imbalance degree in step S1104, and the manager having identified the output information performs a next operation to write a power quantity imbalance report or performs an operation for improving the power quantity imbalance by using the output information.

Although it has been described that the method of analyzing the imbalance degree of power quantities processed by the plurality of power converting modules according to an embodiment of the present invention is performed through the process of FIG. 11, it is only for the convenience of description, and an order of performance processes of respective steps may be changed, two or more steps may be combined, or one step may be divided into two or more steps and then performed without departing from the essential concept of the present invention.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An apparatus for controlling three or more power converting modules, the power converting modules sharing a terminal and converting power by chopping the power by using a power semiconductor, and each of the power converting modules including a current sensor and a current controller that uses the current sensor, the apparatus comprising:

a sensing unit for measuring an electrical characteristic of a common circuit element, the electrical characteristic being at least one of current or voltage formed in the common circuit element, wherein each of the three or more power converting modules is associated with a predefined measurement time domain within a predetermined cycle, and the sensing unit measures the electrical characteristic of the common circuit element at the predefined measurement time domain for a given power converting module; and a compensator for distinguishing the electrical characteristic measured by the sensing unit at the predefined measurement time domains with a respective power converting module and compensating for an imbalance detected in the three or more power converting modules, wherein:

the common circuit element is disposed between the terminal and the three or more power converting modules, the electrical characteristic varies based on an amount of current drawn by each of the three or more power converting modules, the compensator calculates a current quantity processed by each of the three or more power converting modules based on the electrical characteristic measured by the sensing unit, the compensator detects an imbalance degree of the current quantities processed by the three or more power converting modules according to a reference value, the compensator identifies an imbalanced power module from among the three or more power converting modules in response to detecting the imbalance degree of power based on the current quantities, and the compensator compensates for the imbalance by adjusting a current reference value for at least one of the three or more power converting modules such that the detected imbalance degree decreases, wherein the current controller of each of the three or more power converting modules compares the current reference value to a measured current value detected by the current sensor.

2. The apparatus as claimed in claim 1, wherein, when a number of three or more power converting modules is N (N is a natural number equal to or larger than 3), the sensing unit measures the electrical characteristic corresponding to the predefined measurement time domains within the predetermined cycle once on every N cycles.

3. The apparatus as claimed in claim 1, wherein the compensator compensates for a current reference value of a first power converting module among the three or more power converting modules such that the detected imbalance degree decreases, and when the imbalance degree does not decrease even though the current reference value of the first power converting module has been compensated for or it is determined that a value of the imbalance degree is changed to a value equal to or smaller than a preset value, the compensator compensates a current reference value of a second power converting module among the three or more power converting modules.

4. The apparatus as claimed in claim 1, wherein the common circuit element is installed at an input terminal and then shared when the three or more power converting modules process power in a buck type, and the common circuit element is installed at an output terminal and then shared when the three or more power converting modules processes power in a boost type.

5. A method of controlling three or more power converting modules that share a terminal, wherein each of the power converting modules includes a current sensor and a controller that uses the current sensor, the method comprising:

measuring an electrical characteristic formed in a common circuit element disposed between the terminal and the three or more power converting modules, wherein the electrical characteristic is at least one of current or voltage, the electrical characteristic varies based on an amount of current drawn by each of the three or more power converting modules, and each of the three or more power converting modules is associated with a predefined time domain within a predetermined cycle; and distinguishing the electrical characteristic measured at the predefined time domains with a respective power converting module;

determining a current quantity processed by each of the three or more power converting modules based on the electrical characteristic measured;

detecting an imbalance degree of the current quantities processed by the three or more power converting modules according to a reference value; and compensating for imbalance by adjusting a current reference value for at least one of the three or more power converting modules such that the detected imbalance degree decreases, wherein the controller of each of the three or more power converting modules compares the current reference value to a measured current value detected by the current sensor.

6. The method as claimed in claim 5, wherein measuring the electrical characteristic comprises, when a number of three or more power converting modules is N (N is a natural number equal to or larger than 3), measuring the electrical characteristic corresponding to the predefined time domains within the predetermined cycle once on every N cycles.

7. The method as claimed in claim 5, wherein compensating for the imbalance comprises compensating for a current reference value of a first power converting module among the three or more power converting modules such that the detected imbalance degree decreases, and compensating for a current reference value of a second power converting module among the three or more power converting modules when the imbalance degree does not decrease even though the current reference value of the first power converting module has been compensated for or it is determined that a value of the imbalance degree is changed to a value equal to or smaller than a preset value.

* * * * *